C. RAMSTEIN-GSCHWIND.
COLOR SCREEN FOR OPTICAL PURPOSES.
APPLICATION FILED DEC. 12, 1906.
970,111.
Patented Sept. 13, 1910.
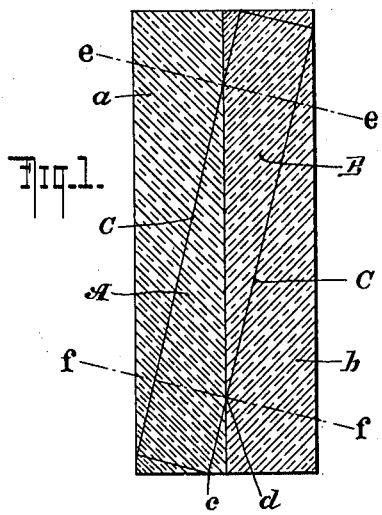
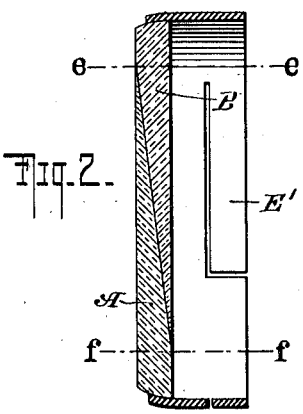
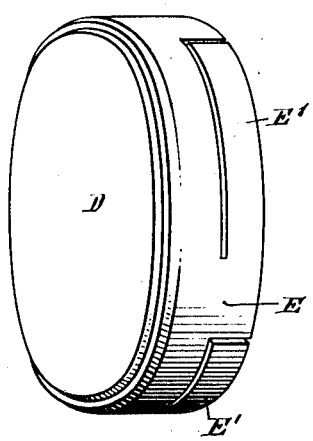
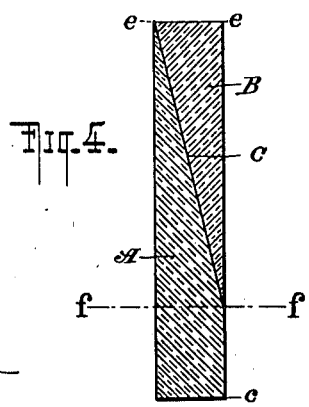
WITNESSES:
INVENTOR
Carl Ramstein-Gschwind
BY
Briesen & Knauth
ATTORNEYS

UNITED STATES PATENT OFFICE.

CARL RAMSTEIN-GSCHWIND, OF BASEL, SWITZERLAND.

COLOR-SCREEN FOR OPTICAL PURPOSES.

970,111.  Specification of Letters Patent.  Patented Sept. 13, 1910.

Application filed December 12, 1906. Serial No. 347,461.

*To all whom it may concern:*

Be it known that I, CARL RAMSTEIN-GSCHWIND, a citizen of the Swiss Republic, and a resident of Basel, Switzerland, have invented certain new and useful Improvements in Color-Screens for Optical Purposes, of which the following is a specification.

My invention relates to so-called color screens, also known as ray filters or light filters, particularly such as are used in photography, generally in front of the camera lens, in order to obtain pictures in which the relative brightness of the colors to one another will be reproduced with a satisfactory approximation to that found in the original.

The object of my invention is to produce a color screen of the above indicated character which will be exceedingly simple, free from disturbing internal reflection and adapted to produce a uniformly increasing "screening" effect from one portion of the screen to the opposite portion, so that a maximum screening effect may be obtained for the upper portion of the picture (formed by the sky or snow-clad mountain summits), with a gradually decreasing opacity to the lower portion of the picture, which generally is much darker than the upper portion.

Reference is to be had to the accompanying drawing in which—

Figure 1 is a diagrammatic section illustrating the method of making my new color screen; Fig. 2 is a cross section of the screen mounted in a holder so that it may be readily applied to a camera lens; Fig. 3 is a perspective view of the mounted screen; and Fig. 4 illustrates another form of my invention.

In carrying out my invention, I take a piece or plate A of colorless or practically colorless glass, and another piece or plate B of colored glass, generally yellow, although my invention is applicable to screens of other colors also. These two pieces of colorless and colored glass, the surfaces of which need not be perfectly plane or polished, I unite so as to form a single optical body, by fusing them together superficially, after bringing them into contact with each other as indicated in Fig. 1. The division line or separating line which is shown in Figs. 1 and 2 for the sake of clearness, is not observable in practice, as the screen actually forms a single body of glass, although it is made from two pieces. These pieces may be fused together in the manner described, either while they are still hot and soft from the manufacturing process, or any suitable colorless and colored glass plates, obtainable in the market, may be used and heated until they are ready for connection by superficial fusion as described. This first step having been accomplished, and the composite glass body having been allowed to cool, such body is ground at an angle on both sides, as indicated by the parallel lines C, C in Fig. 1. That is, the portions a, b outside the lines C, C are removed, so that the completed article contains only material between the lines C, C, or rather, the parallel planes indicated thereby. The new plate thus produced is cut into disks in the usual manner, Figs. 2 and 3 showing such a disk D mounted in a holder E having spring fingers E' for adapting it on a camera lens of ordinary construction.

It will be seen that the color screen produced in the manner above set forth consists of colored glass in its entire thickness at one end (the upper end) and of colorless glass in its entire thickness at the other end (the lower end), there being a gradual transition in the proportions of colored glass and colorless glass from one end to the other. The appearance of the screen therefore is strongly yellow (or otherwise colored) at one end, the tint growing gradually lighter toward the other end until its entire disappearance. The lower portion of the screen is absolutely colorless in its entire thickness for a material distance, viz, from the point c to the point d, the colored portion of the screen terminating at said point d which is at a distance from the lower edge c. Such a color screen when used in connection with a camera lens, will give the proper relative values to the colors of the sky, clouds, mountains, etc., and the lower parts of the picture. The effect will be a much closer rendition of the color relations of the original scenery or object than when ordinary color screens are employed. The fact that there are no interior meeting surfaces, does away with the possibility of disturbing internal reflections. Furthermore, by fusing the adjacent glass surfaces together, I make them fit each other with absolute accuracy (that is, without leaving any spaces between them) and avoid any necessity for carefully grinding such surfaces. The only surfaces which are ground are those designated by the lines C, C, that is, the exposed surfaces of the finished color screen. In practice it will be simplest and best, in order to have as little waste of material as possible, to use pieces A and B which are of about the same thickness.

If desired, I could cut away the upper portion of the screen where it is colored in its entire thickness, above the line e—e, thus producing a screen of the character shown in Fig. 4. In any event, one edge portion of the screen (below the line f—f, Figs. 1, 2 and 4) is colorless in its entire thickness, so that a material portion of the screen will be of uniform transparency allowing a maximum of light to pass therethrough. The term "colorless" as used in the claims is to be given a relative meaning.

I claim as my invention:

1. A color screen for optical purposes, consisting of an integral body of glass composed of a colorless part and a colored part, the colored part decreasing in thickness toward one edge of the screen and terminating at a distance from said edge, so that a material portion of said screen, adjacent to such edge, will be colorless in its entire thickness.

2. A color screen for optical purposes, composed of a colorless part and a colored part, the colored part decreasing in thickness toward one edge of the screen and terminating at a distance from said edge, so that a material portion of said screen, adjacent to such edge, will be colorless in its entire thickness.

In testimony whereof, I have hereunto signed my name in the presence of two subscribing witnesses.

CARL RAMSTEIN-GSCHWIND.

Witnesses:
 CARL AROL,
 GEO. GIFFORD.